United States Patent Office 3,470,296
Patented Sept. 30, 1969

3,470,296
PESTICIDAL METHODS AND A COMPOSITION COMPRISING ARYLPHOSPHATES AND ARYLTHIOPHOSPHATES
Theodore Largman, Morristown, and Peter E. Newallis, Morris Plains, N.J., assignors to Allied Chemical Corporation, New York, N.Y., a corporation of New York
No Drawing. Filed Dec. 16, 1966, Ser. No. 602,119
Int. Cl. A01n *9/36;* C07f *9/12*
U.S. Cl. 424—217        8 Claims

ABSTRACT OF THE DISCLOSURE

Organic esters of phosphoric acid and thiophosphoric acid, useful as insecticides. Two of the alcoholic moieties of the ester are derived from lower aliphatic alcohols and the third alcoholic moiety is derived from a substituted phenol. Such compounds are prepared by reacting a dialkyl chlorophosphate ester or dialkyl chlorothiophosphate ester with a substituted phenol.

---

Background of the invention

Our invention relates to novel organic phosphates and particularly to their use as insecticides.

Summary of the invention

The following general structure represents the compounds of our invention:

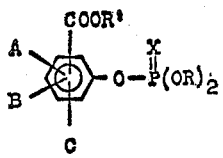

wherein:
X represents a sulfur or oxygen radical,
R and R' represent lower alkyl radicals having 1 to 5 carbon atoms,
A represents a halogen or nitro radical,
B represents a hydrogen, halogen, or nitro radical, and
C represents a hydrogen or OPX(OR)$_2$ radical.

Representative compounds of the present invention are as follows:

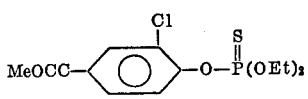

Diethyl-(4-carbomethoxy-2-chlorophenyl)-thiophosphate

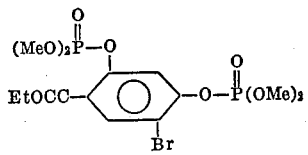

Ethyl-2,4-bis-(dimethylphosphinoxy)-5-bromobenzoate

Accordingly, one object of our invention is to provide a new class of derivatives of phosphoric acid.

These compounds are viscous liquids which are soluble in many common organic solvents but are essentially insoluble in water. Their toxicity toward insects makes them useful as pesticides and they can be employed as active toxicants in compositions for the control of a number of insect organisms such as flies, beetles, worms, roaches, cattle grubs, aphids, and the like. Furthermore, the toxic potency of this class of compounds is such as to permit their effective use as dilute solutions in soaps, sprays, paints, oils, and the like.

Hence, another object of the invention is the use of these substances as insecticides.

The novel compounds of the present invention may be prepared by reacting a phosphorochloridate having the formula:

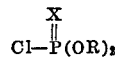

with substituted phenols having the general formula:

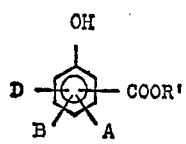

and wherein D represents a hydrogen or hydroxyl radical, and A, B, X, R and R' have the same significance as indicated above. The reaction is conducted in the presence of a hydrogen halide scavenger such as an alkali carbonate or a tertiary organic amine and is most conveniently carried out in any of the commonly used inert organic liquids such as acetone, benzene, dimethylformamide or carbon tetrachloride. Although not necessary to the success of the method, approximately equivalent proportions of the above reagents are preferred, together with a catalytic amount of copper powder. The reaction proceeds smoothly and most efficiently when the reactants are stirred together for periods of up to several days at the reflux temperature of the solvent. Following completion of the reaction, the solid phase is removed by filtration and the solvent flashed off at reduced pressure to obtain the desired product as a residue. This material can be further purified by dissolving it in a water-immiscible organic solvent and washing with aqueous alkali and then with water. The organic phase is then treated with a drying agent and concentrated at reduced pressure.

Description of the preferred embodiments

The following are typical examples for the purpose of illustrating the present invention but are not intended to be limiting on the scope thereof. The reaction conditions can also be modified without departing from the spirit of the invention which is set forth in the claims.

EXAMPLE I

Diethyl-(4-carbomethoxy-2-chlorophenyl)-thiophosphate

To a solution of 2.00 g. (0.0107 mole) of methyl 3-chloro-4-hydroxy benzoate in 50 ml. of acetone is added 2.00 g. (0.0106 mole) of diethyl chlorothiophosphate, 2.00 g. (0.0145 mole) of potassium carbonate and 0.1 g. of copper powder. The mixture is stirred under reflux for 2.5 days and then filtered to remove solid matter. The acetone is removed by flash evaporation and the residue dissolved in 50 ml. of benzene and successively washed with 50 ml. of 3% aqueous sodium hydroxide and 50 ml. of water. The benzene layer is dried over anhydrous magnesium sulfate and filtered. The solvent is removed at reduced pressure, leaving 3.3 g. (91% of theory) of a light yellow oil.

*Analysis.*—Calcd. for $C_{12}H_{16}O_5ClPS$: C, 42.6; H, 4.72. Found: C, 41.7; H, 4.65.

In a similar manner, the following compounds are prepared. This list is intended to represent typical examples and is not meant to be inclusive of all possibilities falling within the scope of the present invention.

| Compound | Analysis | |
|---|---|---|
| | Calcd. | Found |
| (EtO)₂P(S)—O—C₆H₂(Cl)(Cl)—COOMe | C, 38.7; H, 4.02 | C, 37.5; H, 4.24 |
| (EtO)₂P(S)—O—C₆H₃(NO₂)—COOMe (para) | C, 41.3; H, 4.55; N, 4.0 | C, 41.7; H, 5.0; N, 3.75 |
| (EtO)₂P(S)—O—C₆H₃(NO₂)—COOMe | C, 39.4; H, 3.99; N, 4.6 | C, 40.3; H, 4.7; N, 4.8 |
| (EtO)₂P(S)—O—C₆H₃(NO₂)—COOMe | C, 41.2; H, 4.58; N, 3.56 | C, 40.5; H, 5.7; N, 3.3 |
| (MeO)₂P(O)—O—C₆H₃(Cl)—COOEt | C, 42.8; H, 4.54 | C, 43.3; H, 5.2 |
| (EtO)₂P(S)—O—C₆H₃(Cl)—COOEt | C, 44.2; H, 5.1 | C, 42.2; H, 5.5 |
| (MeO)₂P(O)—O—C₆H₃(Cl)—COOPrⁱ | C, 44.7; H, 4.97 | C, 46.8; H, 5.7 |
| (Et₂O)₂P(S)—O—C₆H₃(Cl)—COOPrⁱ | C, 45.9; H, 5.46 | C, 47.6; H, 5.5 |
| (MeO)₂P(O)—O—C₆H₃(EtOOC)—NO₂ | C, 41.3; H, 4.38 | C, 45.4; H, 4.58 |
| (EtO)₂P(S)—O—C₆H₃(EtOOC)—NO₂ | C, 43.0; H, 4.97 | C, 42.5; H, 4.83 |
| (EtO)₂P(S)—O—C₆H₂(Br)(MeOOC)—Br | C, 31.1; H, 3.24 | C, 28.5; H, 3.46 |

EXAMPLE II

Ethyl 2,4-bis-(dimethylphosphinoxy)-5-bromobenzoate

To a solution of 2.6 g. (0.010 mole) of ethyl 2,4-dihydroxy-5-bromo-benzoate in 50 ml. of benzene was added to 3.0 g. (0.021 mole) of dimethyl chlorophosphate, 2.8 g. (0.020 mole) of potassium carbonate, and 0.1 g. of copper powder. The mixture was stirred under reflux for 1 hour and filtered to remove the solid matter. The filtrate was then concentrated at reduced pressure to give 3.0 g. (63% of theory) of a yellow oil. The compound has the following structure:

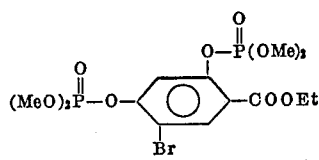

In a similar manner, the following compounds are prepared. This list is intended to represent typical examples and is not meant to include all possibilities falling within the scope of the present invention.

COMPOUND

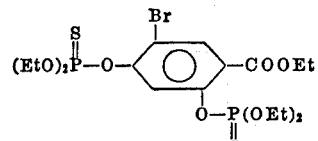

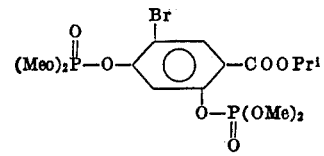

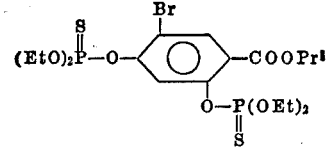

The compounds of the present invention are useful as insecticides in a variety of industrial and agricultural operations. In carrying out the method of the present invention, the undesirable pests can be controlled by contacting the insect, its habitat, and/or its food prior to ingestion with insecticidal amounts of the compounds herein presented.

It will be understood that the terms "insect" and "insecticide" are used herein to include spiders, mites, ticks and the like pests which are not in the strict biological sense classed as insects.

It was found that by using the compounds of the present invention, one hundred percent kills are observed in non-systemic primary tests involving adult house flies and two-spotted spider mites. With adult house flies, the insecticides of the present invention are incorporated in dry bait at a concentration of 0.125%. With two-spotted spider mites, the insecticides are sprayed onto leaves in aqueous acetone solution at a concentration of 4.5 g./100 gallons.

The following examples illustrate the method used for the control of insects by the administration of the compounds of the present invention.

EXAMPLE III

Adult flies held in a cage consisting of two 5" screen-wire hemispheres clamped together and mounted on a turn-table arrangement in a spray hood are sprayed by an atomizing gun operated at 12 p.s.i., which delivers 1.0 ml. of solution toward the cage. The nozzle is set 19" from the center of the cage to be sprayed. The test concentration used is a 0.125% acetone solution of diethyl-(4-carbomethoxy-2-chlorophenyl) - thiophosphate. Immediately after spraying the flies are liberated into 8" cubical holding cages containing a cotton wad soaked in sugar solution for food supply. Knock-down counts made 24 hours after spraying indicated a kill of 100%.

EXAMPLE IV

Young horticultural (cranberry) bean plants in 2½ inch pots are infested with mites (all stages) one day before treatment. An acetone solution of methyl-(4-carbomethoxy-2,5-dichlorophenyl)-thiophosphate is used at a concentration of 4.8 g./100 gallons. In treating the plants, the upper surface is sprayed for 2 seconds and the under surface for 5 seconds. The spray is delivered from a De Vilbiss nozzle operated at 20 p.s.i. at a distance of about 18" from the nozzle. Following treatment, potted plants are placed in irrigated trays in the greenhouse and initial kills of adults are recorded 3 days later. Residual and ovicidal observations of 100% are made 7–8 days after treatment which allows ample time for eggs to hatch under greenhouse conditions. One leaf from each plant is used to make 3-day counts, and the remaining leaf on each plant is used to determine residual and ovicidal activity.

In a similar manner the following compounds were tested and the results summarized in Table I. This list is intended to represent typical examples and is not meant to include all the variations falling within the scope of our invention as set forth in the appended claims.

TABLE I.—PRIMARY TESTS

| Compound | Non-systemic tests two-spotted spider mite (4.8 g./100 gals.), percent | House fly (0.125% bait), percent |
|---|---|---|
| (EtO)₂P(S)—O—C₆H₃(Cl)—COOMe | | 100 |
| (EtO)₂P(S)—O—C₆H₂(Cl)(Cl)—COOMe | 100 | 100 |

TABLE I—Continued

| | | |
|---|---|---|
| (EtO)₂P(S)—O—C₆H₃(NO₂)—COOMe | 100 | 100 |
| (MeO)₂P(O)—O—C₆H₃(NO₂)—COOMe | 100 | 100 |
| MeOOC—C₆H₃(NO₂)—O—P(S)(OEt)₂ | 100 | 100 |

We claim:

1. Insecticidal composition comprising as the active ingredient a compound of the formula:

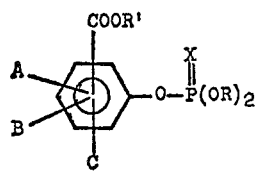

wherein:
R and R′ independently represent alkyl having 1 to 5 carbon atoms,
X is sulfur,
A represents a member selected from the group consisting of chlorine, bromine, iodine and nitro,
B represents a member selected from the group consisting of hydrogen, chlorine, and bromine,
C represents a member selected from the group consisting of hydrogen and OPX(OR)₂; and an inert carrier therefor.

2. The process of combatting insects and mites which comprises exposing the insects and mites to toxic amounts of a substituted aryl phosphate having the following formula:

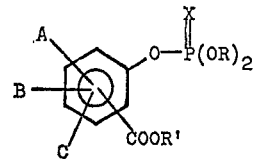

wherein:
R and R′ independently represent alkyl having 1 to 5 carbon atoms,
X is sulfur,
A represents a member selected from the group consisting of chloride, bromine, iodine and nitro,
B represents a member selected from the group consisting of hydrogen, chlorine, and bromine, and
C represents a member selected from the group consisting of hydrogen and OPX(OR)₂.

3. The process of combatting insects and mites which comprises exposing the insects and mites to toxic amounts of a compound of claim 2 wherein C represents hydrogen.

4. The process of combatting insects and mites which comprises exposing the insects and mites to toxic amounts of a compound of claim 2 wherein R represents ethyl and C represents hydrogen.

5. The process of combatting insects and mites which comprises exposing the insects and mites to toxic amounts of a compound of claim 2 wherein R represents methyl and C represents hydrogen.

6. The process of combatting insects and mites which comprises exposing the insects and mites to toxic amounts of a compound of claim 2 having the following formula:

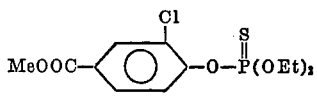

7. The process of combatting insects and mites which comprises exposing the insects and mites to toxic amounts of a compound of claim 2 having the following formula:

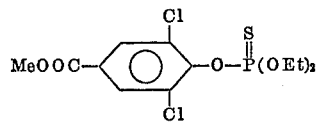

8. The process of combatting mites which comprises exposing the mites to toxic amounts of a substituted aryl phosphate having the following formula:

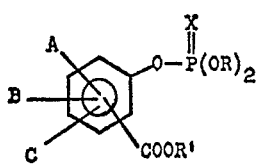

wherein:
R and R' independently represent alkyl having 1 to 5 carbon atoms,
X is sulfur,
A represents a member selected from the group consisting of chloride, bromine, iodine and nitro,
B represents a member selected from the group consisting of hydrogen, chloride, and bromine, and
C represents a member selected from the group consisting of hydrogen and $OPX(OR)_2$.

References Cited

UNITED STATES PATENTS

| | | | |
|---|---|---|---|
| 2,223,329 | 11/1940 | Moyle | 260—941 |
| 3,244,775 | 4/1966 | Richter | 260—930 |
| 3,351,682 | 11/1967 | Baker et al. | |

ALBERT T. MEYERS, Primary Examiner

S. J. FRIEDMAN, Assistant Examiner

U.S. Cl. X.R.

260—930, 941; 424—204